United States Patent [19]

Ohsawa

[11] Patent Number: 5,177,798
[45] Date of Patent: Jan. 5, 1993

[54] SOUND REPRODUCER FOR HIGH DEFINITION TELEVISION

[75] Inventor: Michio Ohsawa, Tokyo, Japan

[73] Assignee: Pioneer Electronic Corporation, Tokyo, Japan

[21] Appl. No.: 752,298

[22] Filed: Aug. 30, 1991

[30] Foreign Application Priority Data

Sep. 13, 1990 [JP] Japan .............................. 2-95571[U]

[51] Int. Cl.5 .............................................. H04R 5/00
[52] U.S. Cl. ...................................... 381/18; 381/22
[58] Field of Search .................................. 381/18, 22

[56] References Cited

U.S. PATENT DOCUMENTS 4,933,768  6/1990  Ishikawa et al. ...................... 381/18
4,953,213  8/1990  Tasaki et al. .......................... 381/22

Primary Examiner—Jin F. Ng
Assistant Examiner—Nina Tong
Attorney, Agent, or Firm—Sughrue, Mion, Zinn, Macpeak & Seas

[57] ABSTRACT

A sound reproducer is disclosed for a Hi-vision 3-1 sound system composed of an audio signal decoding unit coupled with an AV amplifier, which amplifier has a surround processor and is originally arranged for reproducing surrounding sounds from two-channel stereophonic audio signals of the Dolby® surround system, wherein volume controllers for controlling right and left rear Hi-vision audio signals of monaural and a center front Hi-vision audio signal, and first through third switching circuits for selecting outputs of the audio signal decoding units, are provided in case of reproducing sounds of the Hi-vision 3-1 sound system, or outputs of the surround processor, in case of reproducing sounds of the two-channel sound surround system, for providing the acoustic balance of the audio signals when the first through third switching circuits are switched to reproduce the sounds of the Hi-vision 3-1 sound system.

3 Claims, 3 Drawing Sheets

SOUND REPRODUCER FOR HIGH DEFINITION TELEVISION

BACKGROUND OF THE INVENTION

1. Field of the Invention

This invention relates to a sound reproducer for a high definition television (hereinafter referred to as "Hi-vision") system and, more particularly, to a sound reproducer of the type for reproducing surrounding sounds in accordance with a Hi-vision sound system by making use of an Audio-Video (AV) amplifier originally arranged for the Dolby (registered trademark) surround system which is one of two-channel sound surround systems.

i. Description of the Prior Art

The Hi-vision system is a television system proposed for the next generation of television systems and is capable of reproducing powerful, fine-grained, rich with colors and high-definition images in a large-sized display as compared with the existing television systems. Accordingly, it is required to provide a sound reproducer of the Hi-vision system with a sense of presence and high quality fit for the high quality Hi-vision images.

To study a sound reproducing system suitable for the Hi-vision images, experiments for evaluating a number of stereophonic sound reproducing systems have been implemented in order to determine the optimum number audio channels to be employed and an arrangement of speakers. Through these experiments, it was found that a 3-1 sound reproducing system is the most suitable in all respects, for reproducing a surrounding sound effect for the Hi-vision images. The 3-1 sound reproducing system has an optimum number of three audio channels and an optimum arrangement of speakers such that three front speakers for the three audio channels and two rear speakers for a monaural audio channel. In the arrangement of the front and rear speakers, two speakers are arranged at the right (R) front and left (L) front of the listener and that one speaker at the center (C) front, while two speakers are arranged at the right (R) rear and left (L) rear of the listener.

The Hi-vision 3-1 sound system is a kind of four-channel stereophonic sound reproducing system consisting of three front audio channels and one rear audio channel and is capable of realizing a so-called surrounding sound effect fit for Hi-vision images as if the listener were in the midst of the reproduced sounds.

In order to reproduce audio signals in accordance with the Hi-vision 3-1 sound system by employing a two-channel stereophonic amplifier, it is necessary to adapt at least three amplifiers in total, one amplifier for the right and left front audio signals, one amplifier for the center front audio signal and one amplifier for the right and left rear audio signals, thus resulting in a large-scaled sound reproducing system.

As an alternative to the above, it may be thought of by those skilled in the art to adapt an AV (audio and video) amplifier employed in the Dolby surround system, wherein three front audio channels of L, R and C and one rear audio channel reproduced are for making four audio channels in total. However, as shown in FIG. 2, the AV amplifier for use in the Dolby surround system converts two-channel stereophonic sound signals of SL and SR, which are fed to input terminals of 1a and 1b, into four-channel, five signals by means of a contained surround processor 2, wherein the five signals are Right and Left front signals of FR and FL, Right and Left rear signals of RR and RL, whereas RR and RL are the same signal, and a Center front signal of FC.

In the circuit configuration as described above, the signals FL and FR are fed directly to main volume controllers 3a and 3b, while the signals RL, RR and FC are fed to main volume controllers 3c, 3d and 3e through balancing volume controllers 4a, 4b and 4c, whereby the sound volume as well as the acoustic balance of reproduced sounds are controlled respectively. The main volume controllers 3a–3e are interlocked each other in the operation.

Each audio signal controlled by the main volume controllers 3a–3e is output to each exterior speaker (not shown) from respective output terminals 7a–7e through connecting terminals 5a–5e and power amplifiers 6a–6e. This circuit configuration, however may cause a problem for the AV amplifier, in case of amplifying the audio signals in accordance with the Hi-vision 3-1 sound system, such that it is possible to apply the front audio signals of two channels R and L, but unable to apply the rear audio signal of one channel S and that the front center audio signal of one channel C thereunto.

To eliminate the above problem, connecting pins are pulled off from the connecting terminals, and the rear audio signal and the front center audio signal may be fed directly to the power amplifiers 6c–6e through the connecting terminals 5c–5e by applying the rear audio signal simultaneously on the audio channels R and L provided for amplifying the audio signals RR and RL and providing the front center audio signal on the audio channel C provided for amplifying the audio signal FC.

However, even with the modification, since the rear audio signal and the front center audio signal are fed directly to the power amplifiers 6c–6e as the audio signals of RR, RL and FC without passing through the volume controllers, another problem is caused such that there is no way to control the acoustic balance between the audio signals.

SUMMARY OF THE INVENTION

It is therefore an object of this invention to provide a Hi-vision sound reproducer capable of controlling acoustic balance between audio signals in the event of reproducing audio signals in accordance with the Hi-vision 3-1 sound system by employing an AV amplifier developed for the Dolby surround system.

A sound reproducer in accordance with this invention comprises a surround processor for converting stereophonic right and left audio signals in two channels into right, left and center front audio signals in three channels and right and left rear audio signals in two channels, first and second power amplifiers for amplifying the right and left front audio signals in two channels and driving two corresponding right and left front speakers, first through third sound volume controllers for controlling center front audio signal in one channel and right and left rear audio signals in two channels, fourth through sixth sound volume controllers (fifth and sixth sound volume controllers are not shown separately in the drawing) for controlling the center front Hi-vision audio signal in one channel and right and left rear Hi-vision audio signals of monaural in two channels, first through third switching circuits for switching outputs between the first through third sound volume controllers and the fourth through sixth sound volume controllers, and third through fifth power amplifiers for amplifying the center front audio signal in one channel and the right and left rear audio signals in two channels fed from the first through third switching circuits and driving a center front speaker and right and left rear speakers, whereby, in case of reproducing audio signals of the Hi-vision 3-1 sound system, outputs of the fourth through sixth sound volume controllers are selected by the first through third switching circuits while, in case of reproducing audio signals of the two-channel sound surround system, outputs of the first through third sound volume controllers are selected by the first through third switching circuits.

As it has been described above, in case of reproducing the audio signals of the Hi-vision 3-1 sound system, since the outputs of the fourth through sixth sound volume controllers are selected by the first through third switching circuits, the right and left front Hi-vision audio signals in two channels are fed directly to the first and second power amplifiers through the surround processor for amplification, the center front Hi-vision audio signal in one channel is fed to the third power amplifier through the fourth sound volume controller for amplification, and the right and left rear Hi-vision audio signals in two channels are fed to the fourth and fifth power amplifiers through the fifth and sixth sound volume controllers for amplification, and then all the amplified audio signals are fed to respective speakers for reproducing the surrounding sounds for the Hi-vision system. Accordingly, the acoustic balance of the audio signals can be adjusted effectively by utilizing the fourth through sixth sound volume controllers.

On the other hand, in case of reproducing the audio signals of the two-channel sound surround system, the outputs of the first through third sound volume controllers are selected by the first through third switching circuits. In this case, the two-channel audio signals are fed to the AV amplifier, and provided are the right and left front audio signals in two channels, the center front audio signal in one channel by adding the two-channel audio signals being fed, and the right and left rear audio signals for monaural in two channels by subtracting the two-channel audio right and left front.

In this way, the derived right and left front audio signals in two channels are fed to the first and second power amplifiers for amplification, the derived center front audio signal in one channel is fed to the third power amplifier through the first volume controller and that the right and left rear audio signals in two channels are fed the the fourth and fifth power amplifiers through the second and third volume controllers for amplification. The amplified audio signals are then applied on respective speakers arranged in front and rear of the user.

In accordance with this invention, it is possible to reproduce audio signals of the Hi-vision 3-1 sound system by making use of an AV amplifier, which contains a surround processor and is developed for the two-channel sound surround system, for providing the acoustic balance of the audio signals.

DETAILED DESCRIPTION OF THE PREFERRED EMBODIMENT

Figure 1:
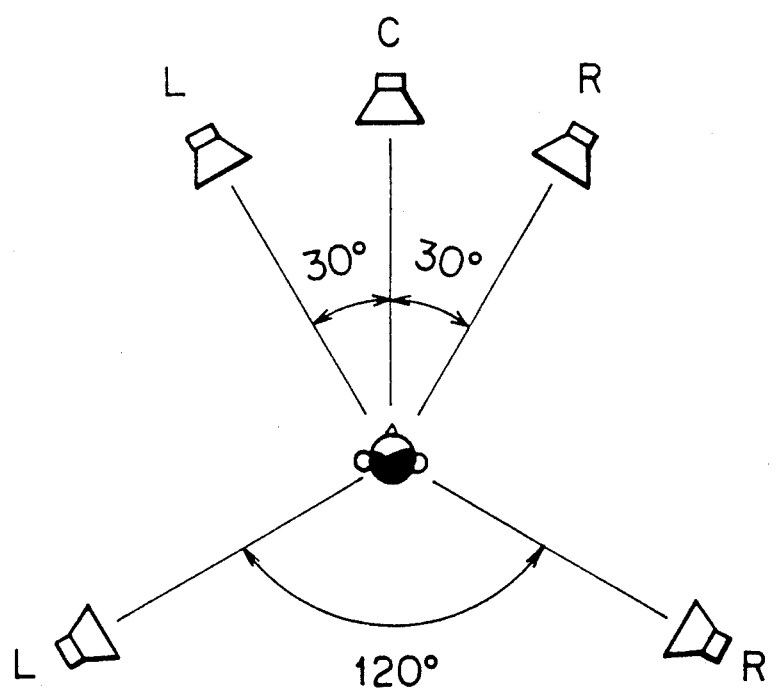
FIG. 1 is a diagram showing a layout of speakers in accordance with the Hi-vision 3-1 sound system.
Figure 2:
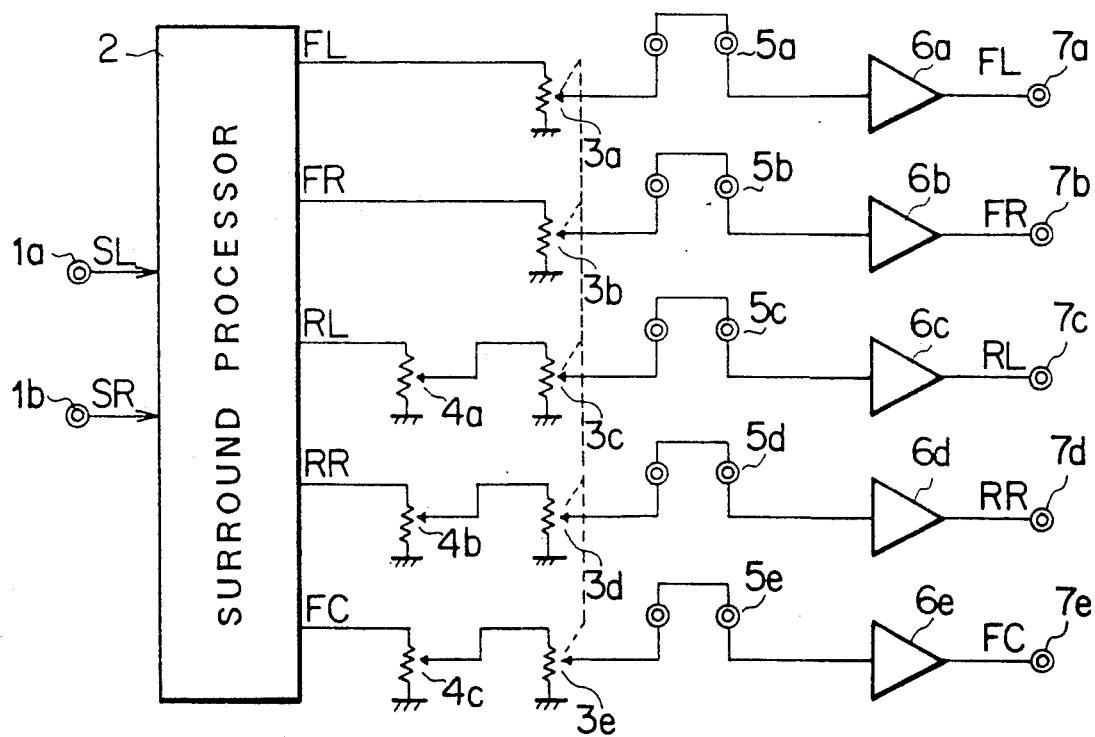
FIG. 2 is a schematic circuit diagram showing an AV amplifier arranged for the Dolby surround system.
Figure 3:
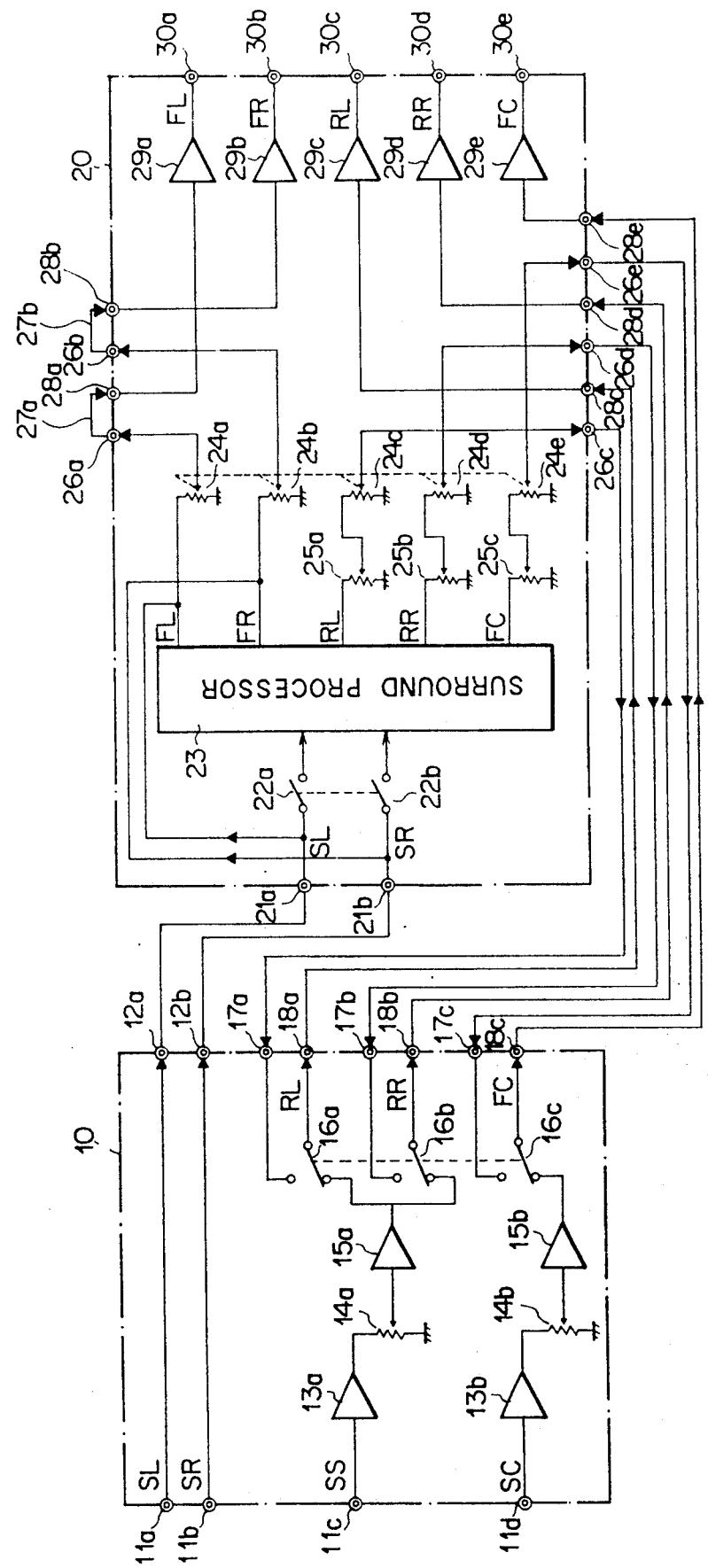
FIG. 3 is a circuit diagram partly in block form showing a sound reproducer embodying the present invention.

The preferred embodiment of this invention will now be described in detail by referring to the accompanying drawings. Referring to FIG. 3, there is shown a sound reproducer for reproducing sound signals in accordance with the Hi-vision 3-1sound system.

The sound reproducer in accordance with this invention consists of a Hi-vision audio signal decoding unit 10 and an AV amplifier 20 arranged for the Dolby surround system. The audio signal decoding unit 10 includes a circuit for providing the AV amplifier 20 with five signals of right front audio signal FR, left front audio signal FL, center front audio signal FC, right rear audio signal RR and left rear audio signal RL by converting the four-channel audio signal of SR (right), SL (left), SS (surround) and FC (center) of the Hi-vision 3-1 sound system thereinto when the sound reproducer is switched to a Hi-vision mode, and by converting the two-channel stereophonic sound signals of SR (right) and SL (left) of the Dolby surround system thereinto when the sound reproducer is switched to a Dolby surround mode.

In operation of the audio signal decoding unit 10, the audio signals SL and SR fed to input terminals 11a and 11b of the audio signal decoding unit 10 will be derived therefrom as they are. The audio signal SS fed to an input terminal 11c has its valve controlled by means of a volume controller 14a after being amplfied by an amplifier 13a, once again amplified by an amplfier 15a, and then fed to one of fixed terminals of both switching circuits 16a and 16b by separating it into two-channel signals. In like manner, the audio signal SC fed to an input terminal 11d has it valve controlled by means of a volume controller 14b after being amplfied by an amplifier 13b, again amplified by an amplifier 15b, and then fed to one of fixed terminals of a switching circuit 16c.

The other fixed terminals of the switching circuit 16a–16c are connected respectively to input terminals 17a–17c for receiving audio signals frodm the AV amplifier 20 hereinafter described in detail. Movable terminals of the switching circuits 16a–16c are connected to output temrinals 18a–18c of the audio signal decoding unit 10, whereby the audio signal applied on the input terminal 17a or the audio signal amplfied by the amplifier 15a is output from the output terminal 18a as the audio signal RL, the audio signal applied on the input terminal 17b or the audio signal amplified by the amplifier 15a is output from the output terminal 18b as the audio signal RR, and all that the audio signal applied on the input terminal 17c or the audio signal amplified by the amplifier 15b is output from the output terminal 18c as the audio signal FC. The selected audio signals FL, FR, RL, RR and FC are in turn fed to the AV amplifier 20 respectively. Further, the switching circuits 16a–16c are interlocked in operation for switching.

The AV amplifier 20 arranged for the Dolby surround system includes a surround processor 23 which derives five signals of right and left front output signals FR, and FL, right and left rear output signals RR and RL of monaural and a center front output signal FC by converting, with a help of an inner contained logic circuit, the reproduced right and left stereophonic audio signals SR and SL fed from input terminals 21a and 21b through interlocked switching circuits 22a and 22b. The audio signals FL and FR amongst the output signals of the surround processor 23 are fed directly to main volume controllers 24a and 24b which are provided for controlling sound volume while the remaining three audio signals of RR, RL and FC are fed to main volume controllers 24c-24e through volume controllers 25a-25c which are provided for controlling acoustic balance.

The main volume controllers 24a through 24e are structurally interlocked. Moreover, it is so arranged in the circuit that the reproduced stereophonic signals SL and SR applied on the input terminals 11a and 11b of the audio signal decoding unit 10 are fed directly to the main volume controllers 24a and 24b at the time when the switching circuits 22a and 22b are turned off.

Outputs of the main volume controllers 24a and 24b are fed to output terminals 26a and 26b and then to input terminals 28a and 28b by means of connecting pins 27a and 27b. Further, outputs of main volume controllers 24c-24e are fed to input terminals 17a-17c of the audio signal decoding unit 10 through output terminals 26c-26e of the AV amplifier 20. Still further, input terminals 28c-28e of the AV amplifier 20 are connected to output terminals 18c-18e of the audio signal decoding unit 10. The audio signals received at the input terminals 28a-28e are then amplified by power amplifiers 29a-29e and fed to respective speakers from output terminals 30a-30e.

In accordance with the circuit configuration as described above, to reproduce audio signal of the Hi-vision 3-1 sound system, the movable terminals of the switching circuits 16a-16c the audio signal decoding unit 10 are switched to the fixed terminals connected to the amplifiers 15a and 15b and, at the same time, the switching circuits 22a and 22b of the AV amplifier are turned off for setting the sound reproducer to the Hi-vision mode.

In the Hi-vision mode, the audio siganls SL and SR supplied to the input terminals 11a and 11b of the audio signal decoding unit 10 are fed directly to the input terminals 21a and 21b through the output terminals 12a and 12b of the audio signal decoding unit 10. The audio signal SS applied to the input terminal 11c of the audio signal decoding unit 10 has its valve controlled by the volume controller 14a for providing the acoustic balance, and fed in turn to the input terminals 28c and 28d of the AV amplifier 20 as the separated audio signals of RL and RR through the switching circuits 16a and 16b. Similarly, the audio signal SC applied to the input terminal 11d of the audio signal decoding unit 10 has its valve controlled by the volume controller 14b for providing the acoustic balance, and fed in turn to the input terminal 28e of the AV amplifier 20 as the audio signal FC through the switching circuit 16c.

In the AV amplifier 20, the audio signals SL and SR received at the input terminals 21a and 21b are fed directly to the main volume controllers 24a and 24b for controlling their values after by-passing the surround processor 23. The volume-controlled audio signal SL is then fed, through the output terminal 26a, connecting pin 27a and input terminal 28a, to and amplified at the power amplifier 29a, and supplied to the left front speaker as an audio signal FL from the output terminal 30a. On the other hand, the volume-controlled audio signal SR is also fed, through the output terminal 26b, connecting pin 27b and input terminal 28b, to and amplified at the power amplifier 29b, and supplied to the right front speaker as an audio signal FR from the output terminal 30b. The audio signals RL, RR and FC received at the input terminals 28c, 28d and 28e are directly amplified by the power amplifiers 29c, 29d and 29e, and supplied respectively to the right and left rear speakers and to the center front speaker.

Consequently, in case of operating under the Hi-vision mode, the sound volume of the audio signal FL and that of the audio signal FR are controlled by means of the volume controllers 24a and 24b, the sound volume of the audio signals RL and RR (i.e. audio signal SS) is controlled by the volume controller 14a and the volume of the audio signal FC is controlled by the volume controller 14b, thus provided is the acoustic balancing between the audio signals in the four channels.

On the contrary, in case of reproducing sounds in accordance with the Dolby surround system, the movable terminals of the switching circuits 16a-16c of the audio signal decoding unit 10 are switched to a side of input terminals 17a-17c and, at the same time, the switching circuits 22a and 22b of the AV amplifier 20 are turned on for operating under the Dolby surround mode.

When the sound reproducer is operating under the Dolby surround mode, the reproduced two-channel sterophonic audio signals SL and SR supplied to the input terminals 11a and 11b of the audio signal decoding unit 10 are output, in the same way as that of the Hi-vision mode, from the output teminals 12a and 12b, and then fed to the input terminals 21a and 21b of the AV amplifier 20.

In the AV amplifier 20, the audio signals SL and SR received at the input terminals 21a and 21b are processed in the surround processor 23 in accordance with a required logic operation, and then output four-channel five signals therefrom. That is, the input signals SL and SR are passed through the surround processor for outputting the unprocessed input signals SL and SR as the right and left front signals Fl and FR, while the input signals SL and SR are subtracted in the surround processor for outputting a subtracted signal (SL−SR) as the right and left rear monaural signals RL and RR, and the input signals SL and SR are added in the surround processor for outputting an added signal (SL+SR) as the center front signal FC.

In the audio signals derived from the surround processor 23, the audio signals FL and FR are fed directly to the main volume controllers 24a and 24b for controlling the sound volume thereof, whereby the volume-controlled audio signals FL is fed to the power amplifier 29a through the output terminal 26a, connecting pin 27a and input terminal 28a, and then the amplified audio signal FL is fed to the left front speaker through the output terminal 30a, while the volume-controlled audio signal FR is fed to the power amplifier 29b through the output terminal 26b, connecting pin 27b and input terminal 28b, and then the amplified audio signal FR is fed to the right front speaker through the output terminal 30b.

Further, the audio signals RL, RR and FC are fed to the volume controllers 25a-25c, and then to the main volume controllers 24c-24e for controlling both the acoustic balance and sound volume. The volume controlled audio signals RL, RR and FC are in turn fed to the input terminals 17a-17c of the audio signal decoding unit 10 through the output terminals 26c-26e.

In the audio signal decoding unit 10, since the movable terminals of the switching circuits 16a-16c are switched to the fixed terminals connected to the input terminals 17a-17c, the input audio signals RL, RR and FC received at the input terminals 17a-17c are fed to the output terminals 18a-18c through the switching circuits 16a-16c, and then to the input terminals 28c-28e of the AV amplifier 20. The audio signals received at the input terminals 28c-28e are fed to the power amplifiers 29c-29e and the amplified audio signals are applied respectively on the right rear speaker, left rear speaker and center front speaker through the output terminals 30c-30e.

As it has been described herein above, according to the present invention, the four-channel audio signals in accordance with the Hi-vision 3-1 sound system can be reproduced properly by providing the adjustment of the acoustic balance therebetween with use of the AV amplifier arranged for the Dolby surround system.

It is to be understood by those skilled in the art that the foregoing description relates only to the preferred embodiment of the invention and that various changes and modifications may be made in the invention without departing from the spirit and scope thereof.

What is claimed is:

1. A sound reproducer for a Hi-vision (high definition television) system comprising:
   surround sound processor means for converting sterophonic audio signals in two channels, a right and a left channel, into front right, left and center channel audio signals in front of a user of the system, and into monaural rear right and left channel audio signals to the rear of said user;
   first and second power amplifier means for amplifying the right and left front audio signals;
   first through third sound volume control means for controlling values of the center front audio signal and right and left rear audio signals;
   fourth and fifth sound volume control means for controlling values of the center front audio signal and monaural right and left rear audio signals;
   first through third switching means for switching outputs of the first through third sound volume control means with that of the fourth and fifth sound volume control means; and
   third through fifth power amplifier means for amplifying the center front audio signal and the right and left rear audio signals fed from the first through third switching means,
   wherein when reproducing audio signals of a Hi-vision 3-1 sound system, outputs of the fourth and fifth sound volume control means are selected by the first through third switching means while, when reproducing audio signals of the two-channel sound surround system, outputs of the first through third sound volume control means are selected by the first through third switching means.

2. A sound reproducer as defined in claim 1, further comprising first and second switching means for by-passing the surround sound processor means with the two right and left channel stereophonic audio signals.

3. A sound reproducer as defined in claim 1, wherein said right and left rear Hi-vision audio signals of monaural are provided by separating a surround signal of the Hi-vision sound system.

* * * * *